UNITED STATES PATENT OFFICE.

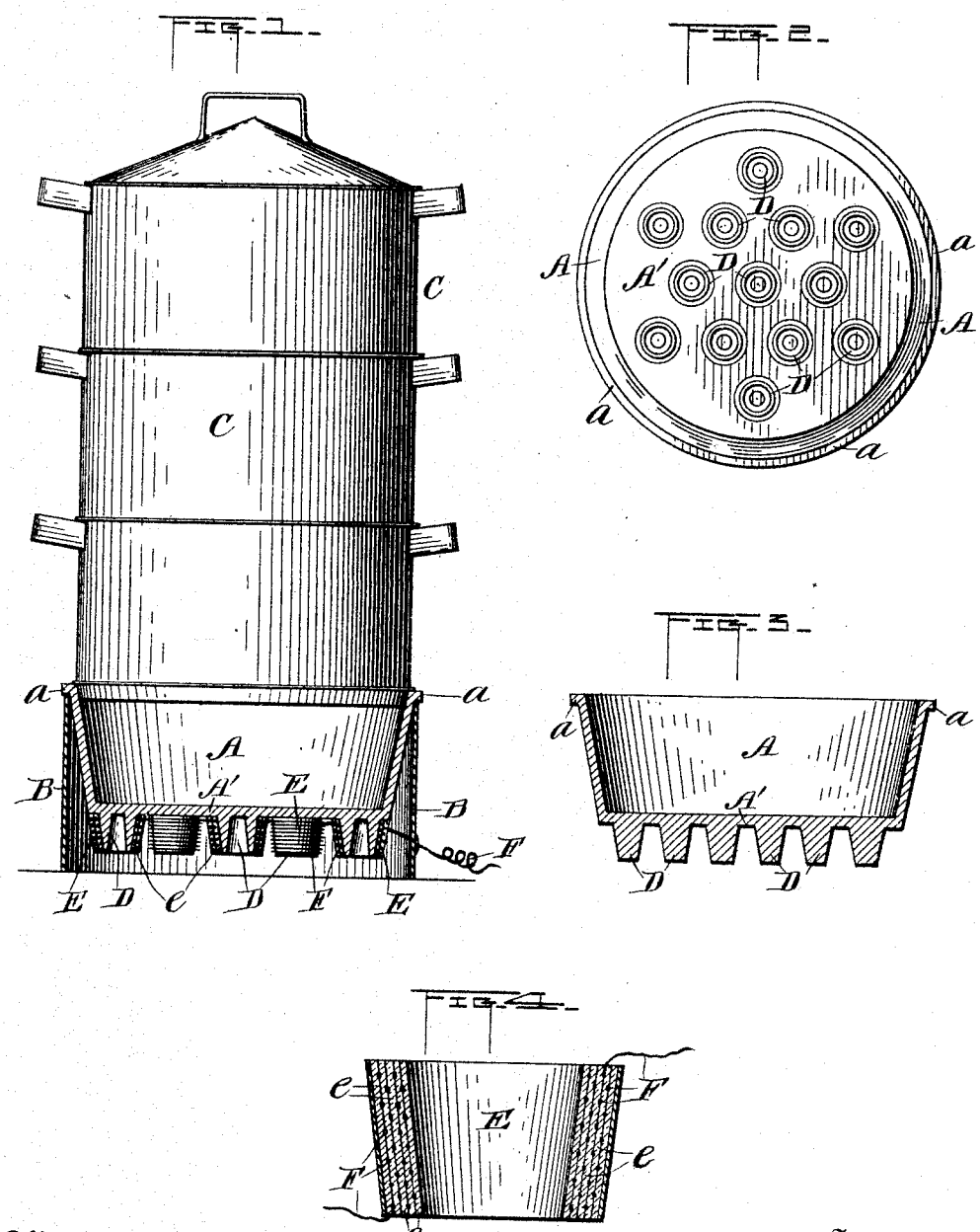

WILLIS MITCHELL, OF MALDEN, ASSIGNOR, BY MESNE ASSIGNMENTS, TO THE AMERICAN ELECTRIC HEATING COMPANY, OF BOSTON, MASSACHUSETTS.

ELECTRICALLY-HEATED VESSEL.

SPECIFICATION forming part of Letters Patent No. 491,321, dated February 7, 1893.

Application filed June 8, 1892. Serial No. 435,933. (No model.)

*To all whom it may concern:*

Be it known that I, WILLIS MITCHELL, a citizen of the United States, residing at Malden, in the county of Middlesex and State of Massachusetts, have invented certain new and useful Improvements in Electrically-Heated Cooking Utensils; and I do hereby declare the following to be a full, clear, and exact description of the invention, such as will enable others skilled in the art to which it appertains to make and use the same.

This invention has for its object to provide an electrically heated cooking vessel or utensil adapted to contain the articles to be cooked or liquid for steaming them and having the cores of its heating devices formed in one piece with it or so attached as to be practically integral, the same being also provided with a reflecting shell whereby the heating effect is increased. To this end I employ the construction and combination of parts hereinafter particularly set forth and claimed.

In the accompanying drawings Figure 1 represents a vertical central section of a cooking utensil embodying my invention the ordinary cooker or stove mounted thereon being in elevation; Fig. 2 represents a plan view, taken from below, of the bottom of this utensil; Fig. 3 represents a vertical central section of the bottom-plate with solid cores in greater number instead of the hollow cores shown in Figs. 1 and 2; and Fig. 4 represents a vertical section of the preferred form of heater embodying my invention.

A designates the body of a vessel or utensil adapted to contain food or liquid and provided at the top which is open with an outwardly extending rim or flange $a$ which rests on a cylindrical surrounding shell B preferably of sheet metal. The sides of the vessel A slope inwardly as shown leaving a space between it and the said shell all around. The latter holds the bottom of the said vessel above the floor or whatever surface the said shell B may rest on. A tall cylindrical cooker or steamer C may be mounted on the top of the said vessel A, to receive into its interior for culinary purposes the steam generated by the said vessel when that method of cooking is adopted; or hot air may be similarly used instead of steam, the heating being due to the devices hereinafter described. But this cooker or steamer C is not at all essential to the operativeness of the device, the vessel A being a stew pan in itself. As shown it is covered and of no very great depth or capacity; but in these respects and as to its form it may be varied very greatly without departing from my invention.

On the bottom A' of the vessel A and extending downward therefrom is a series of cores D made tubular for lightness and having the form of truncated cones presented downward (Figs. 1 and 2); or these conoidal cores may be made solid and in greater number though of smaller size, as in Fig. 3. An electric heater E of similar form (Fig. 4) is fitted on each of these cores; being composed of successive cylindrical layers $e$ of asbestos with wire F wound continuously on them in succession from end to end reversing as needed; also a sheet metal shell surmounting or inclosing all. This form of heater is not new in the present improvement; but very well adapted to the purpose in view. The said heaters may be connected in series a single wire answering for all; or any other known arrangement or method of connection may be adopted instead. Sometimes instead of these individually complete heaters I may use a wire covered with insulating coating or otherwise insulated the same being wound in successive helices on the cores one after the other. The shell B reflects the heat inward and thus very greatly increases the calorific effect. The cores D are preferably cast with the said vessel A but may be made practically integral therewith in any other manner.

Of course other suitable conductors of electricity may be used for the heaters instead of wire.

Having thus described my invention, what I claim as new and desire to secure by Letters Patent is:

1. In combination with a cooking utensil having cores formed integral therewith electrical heating-devices applied to the said cores and a reflecting shell surrounding the same substantially as set forth.

2. In combination with a cooking vessel having cores on its bottom, electric heating devices applied to the said cores and a reflecting shell surrounding the same as set forth.

3. In combination with a cooking vessel provided with cores, electrical heating devices applied to the latter, and an inclosing reflecting shell which also supports the said vessel substantially as set forth.

In testimony whereof I affix my signature in presence of two witnesses.

WILLIS MITCHELL.

Witnesses:
    EDWIN W. PIERCE,
    PELATIAH R. TRIPP.